(12) United States Patent
Sailor et al.

(10) Patent No.: US 10,704,263 B2
(45) Date of Patent: Jul. 7, 2020

(54) HIGH ALBEDO MOISTURE-RETAINING FOAM ROOFING AND FACADE SYSTEMS

(71) Applicant: Arizona Board of Regents on behalf of Arizona State University, Scottsdale, AZ (US)

(72) Inventors: David J. Sailor, Phoenix, AZ (US); Nils Jannik Heusinger, Tempe, AZ (US); Amir Baniassadi, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/358,099

(22) Filed: Mar. 19, 2019

(65) Prior Publication Data

US 2019/0292787 A1    Sep. 26, 2019

Related U.S. Application Data

(60) Provisional application No. 62/645,348, filed on Mar. 20, 2018.

(51) Int. Cl.
| | | |
|---|---|---|
| *E04D 1/28* | (2006.01) | |
| *E04D 1/12* | (2006.01) | |
| E04D 1/34 | (2006.01) | |
| E04D 1/30 | (2006.01) | |

(52) U.S. Cl.
CPC ............... *E04D 1/28* (2013.01); *E04D 1/12* (2013.01); *E04D 2001/308* (2013.01); *E04D 2001/3461* (2013.01); *E04D 2001/3494* (2013.01)

(58) Field of Classification Search
CPC .... E04D 1/28; E04D 1/20; E04D 1/12; E04D 2001/308; E04D 2001/3461; E04D 2001/3494; E01C 9/004; E01C 11/225; E01C 2201/16
USPC ................................................. 51/11, 747.11
See application file for complete search history.

(56) References Cited

U.S. PATENT DOCUMENTS

| | | | | |
|---|---|---|---|---|
| 3,855,132 A | * | 12/1974 | Dugan ................... | E04D 13/076 210/455 |
| 7,407,340 B2 | * | 8/2008 | Byles ...................... | A01G 9/00 405/45 |
| 8,220,206 B2 | * | 7/2012 | Konkey ................ | E04D 13/076 210/162 |
| 8,800,211 B2 | * | 8/2014 | Sharkey ................ | E04D 13/064 52/11 |

(Continued)

FOREIGN PATENT DOCUMENTS

| | | |
|---|---|---|
| CA | 2700770 C | 9/2013 |
| WO | 2014144848 | 9/2014 |

OTHER PUBLICATIONS

EIA, 2017. Annual Energy Outlook. U.S. Energy Information Administration, U.S. Department of Energy.

(Continued)

*Primary Examiner* — Beth A Stephan
(74) *Attorney, Agent, or Firm* — Snell & Wilmer L.L.P.

(57) ABSTRACT

Exemplary systems and methods allow for enhanced energy performance of buildings, for example hybrid roof systems. The system may utilize a material having a porous water-retaining substrate and a high albedo coating. The high albedo coating may be disposed on the outer surface of the porous water-retaining substrate.

8 Claims, 10 Drawing Sheets

(56) References Cited

U.S. PATENT DOCUMENTS

| | | | |
|---|---|---|---|
| 9,879,429 B2* | 1/2018 | Joly, Jr. | E04D 13/0643 |
| 2002/0007591 A1* | 1/2002 | Mischo | A01G 9/033 47/65.9 |
| 2005/0178072 A1* | 8/2005 | Olthoff | E04D 13/002 52/12 |
| 2007/0094927 A1* | 5/2007 | Perry | A01G 9/033 47/65.9 |
| 2007/0193116 A1* | 8/2007 | Luckett | A01G 20/20 47/65.9 |
| 2010/0139194 A1* | 6/2010 | Burns | E04D 13/0477 52/309.6 |
| 2011/0113702 A1* | 5/2011 | Hasan | E04D 11/002 52/173.1 |
| 2011/0223385 A1* | 9/2011 | Shiao | C04B 20/1051 428/144 |
| 2013/0031833 A1* | 2/2013 | MacKinnon | A01G 9/033 47/65.6 |
| 2013/0056172 A1* | 3/2013 | Byles | E04D 13/0404 165/47 |
| 2013/0167440 A1* | 7/2013 | Fischer | E04D 11/002 47/65.9 |
| 2014/0157663 A1* | 6/2014 | Boldrin | C08K 3/34 47/17 |
| 2014/0271440 A1* | 9/2014 | Constantz | C01F 11/181 423/430 |

OTHER PUBLICATIONS

EISA, 2007. Energy Independence and Security Act of 2007. Summary Provisions.

CEC, 2013. Building Energy Efficiency Standards for Residential and Nonresidential Buildings. California Energy Commission.

Lazzarin, R.A., Castellotti, F, Bustato, F., 2005. Experimental measures and numerical modeling of a green roof. Energy and buildings 37, 1260-1267.

Baniassadi, A., Sajadi, B. Amidpour, M., Noori, N., 2016. Economic optimization of PCM and insulation layer thickness in residential buildings. Sustainable Energy Technologies and Assessments 14, 92-99.

Zinzi, M., Agnoli, S., 2012. Cool and green roofs. An energy and comfort comparison between passive cooling and mitigation urban heat island techniques for residential buildings in the Mediterranean region. Energy and Buildings 55, 66-76.

Akbari, H., Bretz, S., Kurn, D.M., Hanford, J., 1997. Peak power and cooling energy savings of high-albedo roofs. Energy and Buildings 25, 117-126.

Simpson, J.R., McPherson, E.G., 1997. The effects of roof albedo modifications on cooling loads of scale model residencies in Tucson, Arizona. Energy and Buildings 25, 127-137.

Boixo, S., Diaz-Vicente, M., Colmenar, A., Castro, M.A., 2012. Potential energy savings from cool roofs in Spain and Andalusia. Energy 38, 425-438.

Jaffal, I., Ouldboukhitine, S.E., Belarbi, R., 2012. A comprehensive study of the impact of green roofs on building energy performance. Renewable Energy 43, 157-164.

Sailor, D.J., Elley, T.B., Gibson, M., 2012. Exploring the building energy impacts of green roof design decisions—a modeling study of buildings in four district climates. Journal of Building Physics 35, 372-391.

Niachou, A. Papakonstantinou, K., Santamouris, M. Tsangrassoulis, A., Mihalakalou, G., 2001. Analysis of the green roof thermal properties and investigation of its energy performance. Energy and Buildings 33, 719-729.

Ramamurthy, P., Sun, T., Rule, K., Bou-Zeid, E. 2015. The joint influence of albedo and insulation on roof performance: An observational study. Energy and Buildings 93, 249-258.

Bretz, S.E., Akbari, H., 1997. Long-term performance of high-albedo roof coatings. Energy and Buildings 25, 159-167.

Sleiman, M., Ban-Weiss, G., Gilbert, H.E., Francois, D., Berdahl, P., Kirchstetter, T.W., Destaillats, H., Levinson, R., 2011. Soiling of buildable.

Velazquez, L.S., 2005. An International Call for the Greenroof Projects Database, The World Green Roof Congress, Basel, Switzerland.

Deru, M., Field, K., Studer, D., Benne, K., Griffith, B., Torcellini, P., Liu, B., Halverson, M., Winiarski, D., Rosenberg, M., 2011. US Department of Energy commercial reference building models of the national building stock.

Sailor, D.J., 2008. A green roof model for building energy simulation programs. Energy and Buildings 40, 1466-1478.

Lengsfeld, K., Holm, A., 2007. Development and validation of the hygrothermal indoor climate simulation software WUFI (R)-Plus. Bauphysik 29, 178-186.

Antretter, F., Saucer, F., Schopfer, T. Holm, A., 2011. Validation of a hygrothermal whole building simulation software, Proceeding of Building Simulation 2011: 12th Conference of International Building Performance Simulation Association, Sydney, Australia, p. 16.

Hagerstedt, S.O., Arfvidson, J., 2010. Comparison of filed measurements and calculations of relative humidity and temperature in wood framed walls, Thermophysics 2010—Conference proceedings, 15th International Meeting of Thermophysics 2010—Conference proceedings, 15th International Meeting of Thermophysical Society, Valtice, Czech Republic, pp. 93-101.

Kunzel, H., Schmidt, T., Holm, A., 2002. Exterior surface temperature of different wall constructions comparison of numerical simulation and experiment, Proceedings of 11th Symposium of Building Physics, Technische Universitat Dresden, Dresden, Germany, pp. 26-30.

Oustad, M., Gustaysen, A.U., Uvslokk, S., 2005. S. Calculation of Moisture and Heat Transfer in Compact Roofs and Comparison with Experimental data, Proceedings of the 7th Symposium on Building Physics in the Nordic Countries. Reykjavik.

Kunzel, H.M., Kiessl, K., 1996. Calculation of heat and moisture transfer in exposed building components. International Journal of heat and mass transfer 40, 159-167.

Kunzel, H.M., 1995. Simulataneous heat and moisture transport in building components. One-and two-dimensional calculation using simple parameters. IRB—Verlag Stuttgart.

Stockl, B., Zirkerbach, D., 2014. Hygrothermal simulation of green roofs—new models and practical application, Nordic Symp. Building Physics, Lund, pp. 15-19.

Minke, G., 2009. Ermittlung des Warmedammverhaltens von Grundachern.

Sproul, J., Wan, M.P. Mandel, B.H., Rosenfeld, A.H., 2014. Economic comparison of white, green, and black flat roofs in the United States. Energy and buildings 71, 20-27.

\* cited by examiner

HIGH ALBEDO MOISTURE-RETAINING FOAM ROOFING AND FACADE SYSTEMS

CROSS-REFERENCE TO RELATED APPLICATIONS

This application claims priority to, and the benefit of, U.S. Provisional Application No. 62/645,348 filed on Mar. 20, 2018, and entitled "HIGH ALBEDO MOISTURE-RETAINING FOAM ROOF SYSTEM." This application is hereby incorporated by reference in its entirety for all purposes.

TECHNICAL FIELD

The present disclosure relates to roofing and facade materials, and in particular to materials suitable for energy conservation and urban heat island mitigation.

BACKGROUND

Energy demand for building operation is a key contributor to global energy demand. Prior approaches to roofing structures and materials have offered limited benefits in the area of energy conservation and/or heat island mitigation. Accordingly, improved roofing materials, systems, and methods remain desirable.

SUMMARY

In an exemplary embodiment, a hybrid roof system for a building comprises a material comprising a porous water-retaining substrate and a high albedo coating disposed on a first side of the porous water-retaining substrate. The hybrid roof system further comprises a rigid frame coupled to a border of the material. The rigid frame further comprises a plurality of interlocking elements for coupling to adjacent rigid frames when installed on a building roof. The rigid frame further comprises aluminum. The high albedo coating further comprises a $TiO_2$ anatase coating. The rigid frame further comprises a grid and a plurality of the material, each material being disposed in a portion of the grid. The hybrid roof system further comprises a building surface, wherein the material is at least one of sprayed, painted, or adhesively bonded to the building surface.

In an exemplary embodiment, a hybrid roof system for a building comprises a plurality of hybrid roof components, each hybrid roof component comprises a material having a porous polyurethane substrate and a high albedo coating, the high albedo coating being disposed on an outer surface of the porous polyurethane substrates. The hybrid roof system further comprises a plurality of frames, each frame having at least one hybrid roof component from the plurality of hybrid roof components disposed within the frame. Each frame comprises a plurality of interlocking components configured to couple each frame to an adjacent frame from the plurality of frames. Each interlocking component from the plurality of interlocking components comprises either a male fastening element or a female fastening element. The high albedo coating comprises a $TiO_2$ anatase coating.

In an exemplary embodiment, a method of retrofitting a building roof comprises coupling, to a building at the removed building roof location, a plurality of roofing panels, wherein each roofing panel comprises a rigid frame and a porous water-retaining substrate disposed within the rigid frame, wherein a high albedo coating is disposed on a first side of the porous water-retaining substrate. The method further comprises directing storm runoff associated with the building onto the plurality of roofing panels. The method further comprises coupling each roofing panel to an adjacent roofing panel. The coupling further comprises interlocking a male element from a first roofing panel from the plurality of roofing panels with a female element from an adjacent roofing panel from the plurality of roofing panels. The method may further comprise removing at least a portion of the building roof.

BRIEF DESCRIPTION OF THE DRAWINGS

With reference to the following description and accompanying drawings.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques for building materials, construction, and use, as well as conventional approaches for high-albedo roofing, vegetated roofing, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical roofing system and/or materials.

As used herein, "building" includes residential and commercial buildings, warehouses, workshops, semi-enclosed spaces, storage units, shipping containers, temporary shelters used by medical organizations or army, and, more generally, any type of space that requires or could benefit from a thermal controlled environment.

Principles of the present disclosure contemplate the use of hybrid roofing technologies that combine the chief benefits of two existing roofing technologies—vegetated green roofs and highly-reflective (high albedo) roof coatings/membranes. Exemplary technologies utilize a combination of moisture retention capabilities and high reflectance to provide a combination of air-conditioning energy savings benefits to buildings while simultaneously benefiting the urban thermal environment by lowering heat convection into the urban atmosphere. These approaches may be utilized as part of a new build, or as part of a retrofit or roof replacement. It will be appreciated that while the term "roof" is often utilized herein for purposes of discussion, principles of the present disclosure may suitably be applied to roofs, facades, and other portions of a building.

Figure 1:
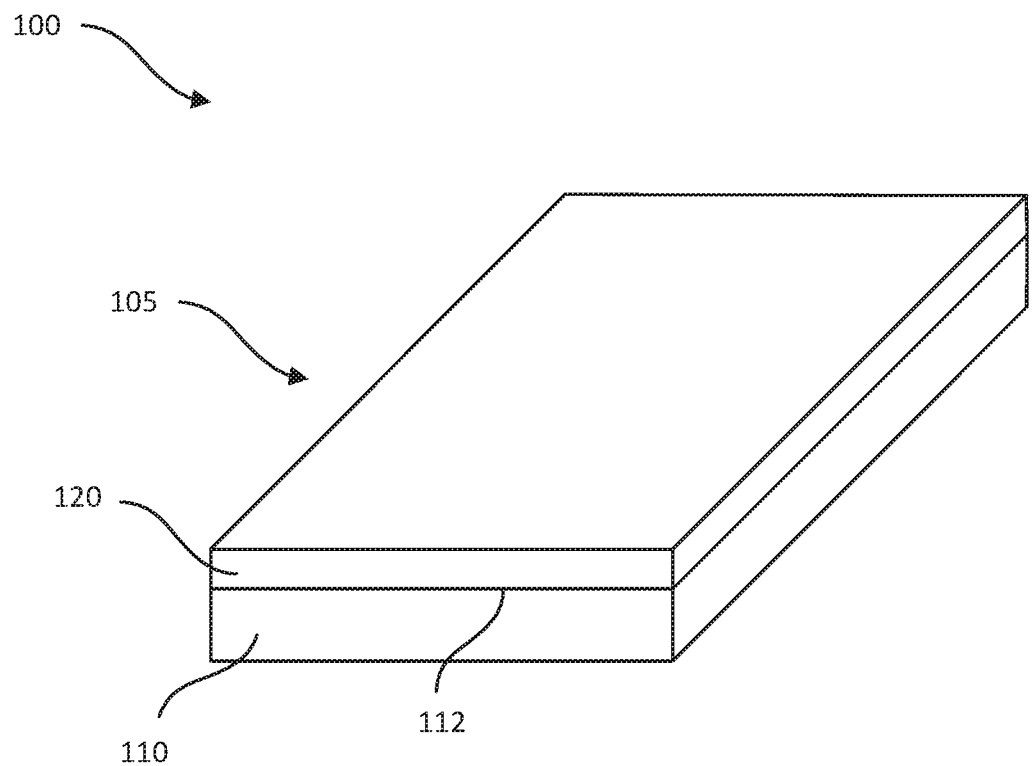
FIG. 1 illustrates a perspective view of an exemplary hybrid roof component in accordance with an exemplary embodiment.

Referring now to FIG. 1, an exemplary hybrid roof component 100, in accordance with an exemplary embodiment is depicted. The hybrid roof component 100 may comprise a material 105. The material 105 may comprise a substrate 110 and a coating 120. The substrate 110 may comprise an outer surface 112. In an exemplary embodiment, the substrate 110 may comprise a core material utilized in exemplary hybrid roofs. For example, the core material may be a foam product similar to that which is currently used as a substrate for vegetated green roofs. However, this foam material may be modified by a coating 120 being disposed on the outer surface 112 of the substrate 110. The coating 120 may make the hybrid roof component 100 highly reflective to the energy content of the sun. While not necessarily white in appearance, many high-albedo materials and coatings are white, but are more generally referred to as "cool", as in cool roofs or cool coatings. In an exemplary embodiment, the coating 120 may comprise a high-albedo coating. In an exemplary embodiment, the substrate 110 may comprise a porous polyurethane substrate. In another exemplary embodiment, the substrate 110 may comprise a durable foam-like material. In yet other exemplary embodiments, the substrate 110 may comprise a grid of moisture-capturing and retaining cells.

Principles of the present disclosure contemplate use of a highly-reflective version of the foam material without a green roof on top of it, as the outermost layer of roofing is directly exposed to the elements (sun and rain). The high reflectance may be achieved in any suitable manner, for example by a porous coating 120 applied to the outer surface 112 of the substrate 110 (e.g., foam) or through pigmentation added to the foam as it is manufactured. In one exemplary embodiment, the porous coating 120 comprises a TiO2 anatase coating, similar to that described in Tianen et al., "Ultra-porous titanium dioxide scaffold with high compressive strength" (J. Mater Sci: Mater Med (2010) 21:2783-2792), the contents of which are hereby incorporated by reference. However, any suitable coating may be utilized. In general, the coating may be a chemical compound that increases reflectance.

In various exemplary embodiments, the foam may be manufactured in such a way as to be resistant to UV radiation and other elements of the outdoor weather that may contribute to aging and/or failure. Depending upon the thickness and rigidity of the foam used and the necessity for roof access, the foam material may be integrated into framed units or other structures, including structures designed to capture and/or retain water in networks of basins, that enable individuals to walk on the surface without damaging the foam. Likewise, the foam material may be integrated into a shingle-type product for use in residential sloped roofs.

In various exemplary embodiments, the substrate 110 may comprise a polyurethane foam (for example, similar to the Vydro brand hydrophilic substrate offered by Hunstman Polyurethanes of Everberg, Belgium) having a coating 120 with a high-albedo disposed on the outer surface 112 of the polyurethane foam.

Figure 2A:
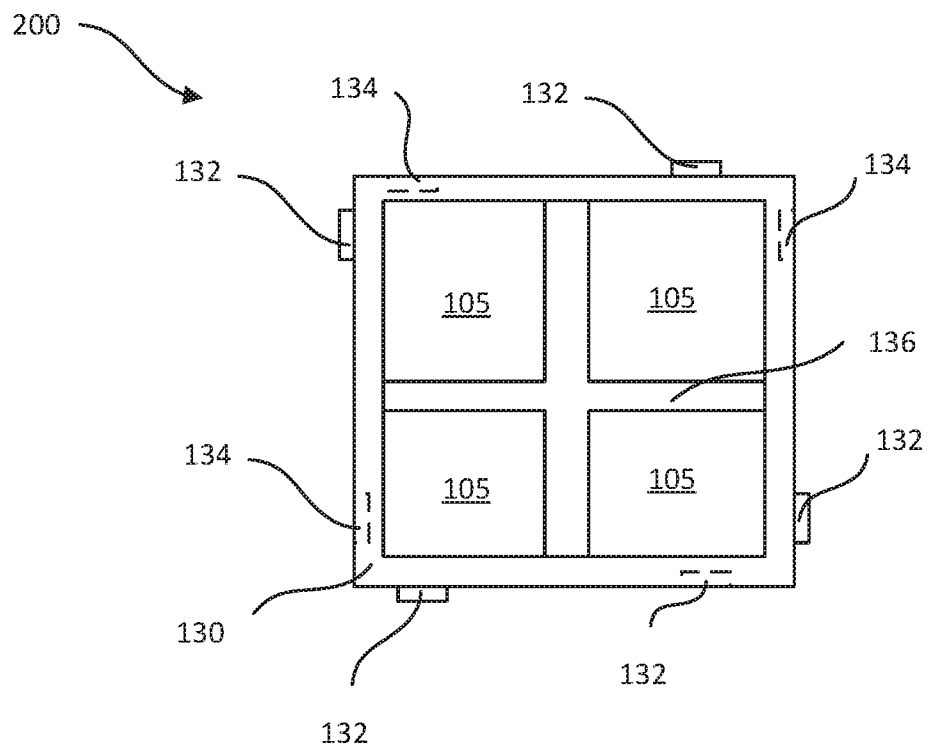
FIGS. 2A and 2B illustrate a top view and a front view of an exemplary hybrid roof component in accordance with an exemplary embodiment.
Figure 2B:
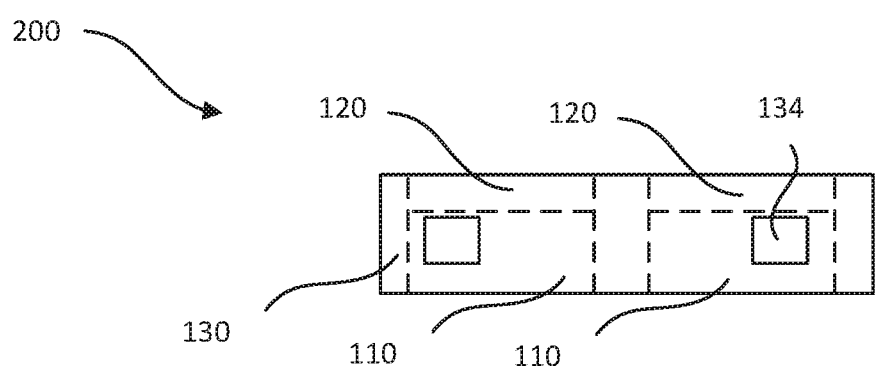

Referring now to FIGS. 2A and 2B, in accordance with an exemplary embodiment, a top view (FIG. 2A) and a front view (FIG. 2B) of a hybrid roof component 200 are depicted. Hybrid roof component 200 may comprise a material 105 and a frame 130. In an exemplary embodiment, frame 130 may be a metallic or plastic structure. In an exemplary embodiment, frame 130 may be an aluminum structure. Frame 130 may provide additional rigidity and support to the roof component 200. Frame 130 may comprise a plurality of interlocking elements (132, 134). The plurality of interlocking elements (132, 134) may be configured to connect to an adjacent frame allowing assembly of multiple frame elements to create a hybrid roof system. In an exemplary embodiment, the frame 130 may comprise a grid 136. Although depicted with a grid 136 in FIG. 2A, a frame without a grid is within the scope of this disclosure. The plurality of interlocking elements (132, 134) may comprise a male element 132 and a female element 134. The female element 134 may be configured to receive a male element 132 from an adjacent frame upon assembly and/or installation. In an example embodiment, a material 105 may be disposed within frame 130. In an example embodiment, a hybrid roof component 200 may comprise a plurality of materials 105 separated by a grid 136 within a frame 130.

In an example embodiment, the material 105 may be bonded to the frame 130. In another example embodiment, the material 105 may be mechanically coupled to frame 130 via clamps, screws, nails, or any other fastening mechanism known in the art. The frame 130 may provide additional structural stability to the hybrid roof component and provide support for foot-traffic, the support preventing damage to the material.

Figure 3:
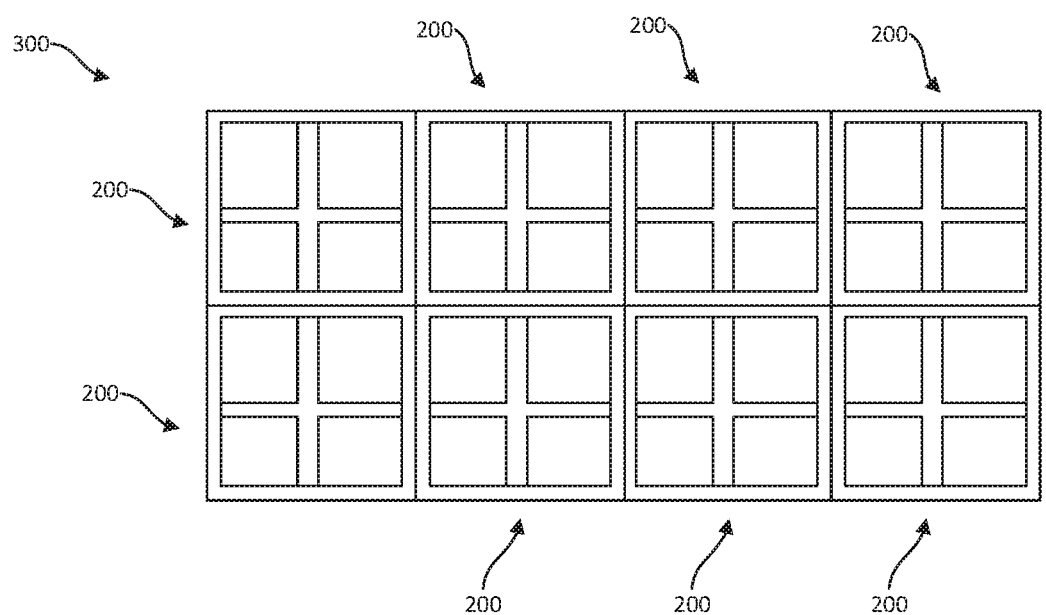
FIG. 3 illustrates a top view of an exemplary hybrid roof system in accordance with an exemplary embodiment.

Referring now to FIG. 3, a top view of a hybrid roof system 300, in accordance with an exemplary embodiment, is depicted. The hybrid roof system may comprise a plurality of hybrid roof components 200 interlocked together. Referring back to FIG. 2, frame 130 may provide structural stability to the hybrid roof system and support an external load, such as someone standing on the hybrid roof system.

Figure 4:
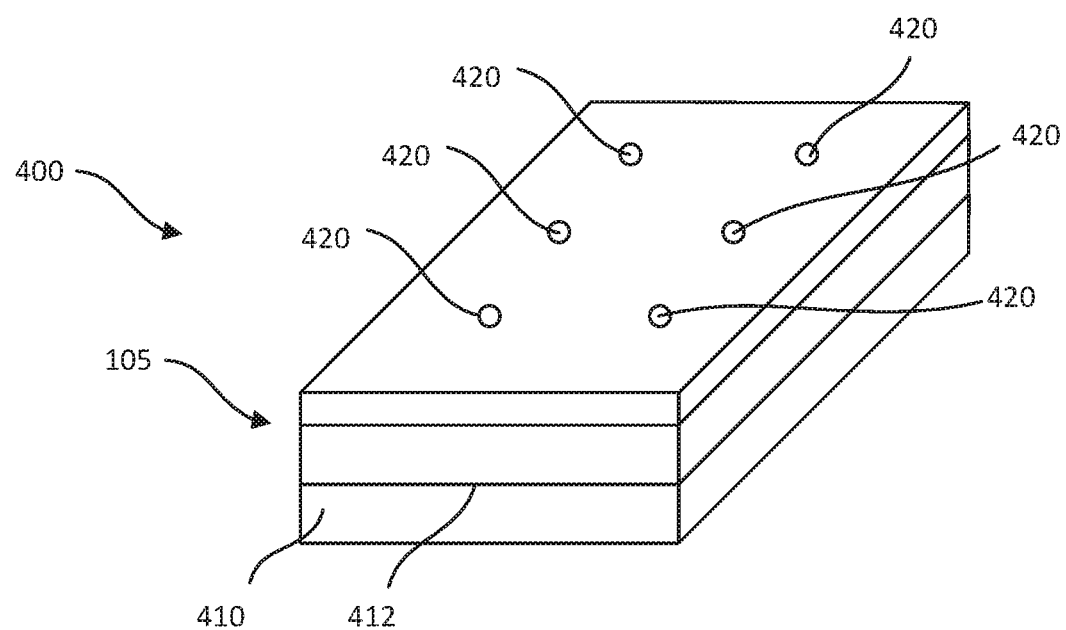
FIG. 4 illustrates a perspective view of an exemplary hybrid roof system in accordance with an exemplary embodiment.

Referring now to FIG. 4, an isometric view of a hybrid roof system 400 is depicted. In an exemplary embodiment, hybrid roof system 400 may comprise a building component 410 having a building surface 412, and a material 105. The material 105 may be affixed in key locations by mechanical components 420. In various embodiments, mechanical components 420 may be clamps, screws, nails, or any other fastening or retaining mechanism known in the art.

Figure 5:
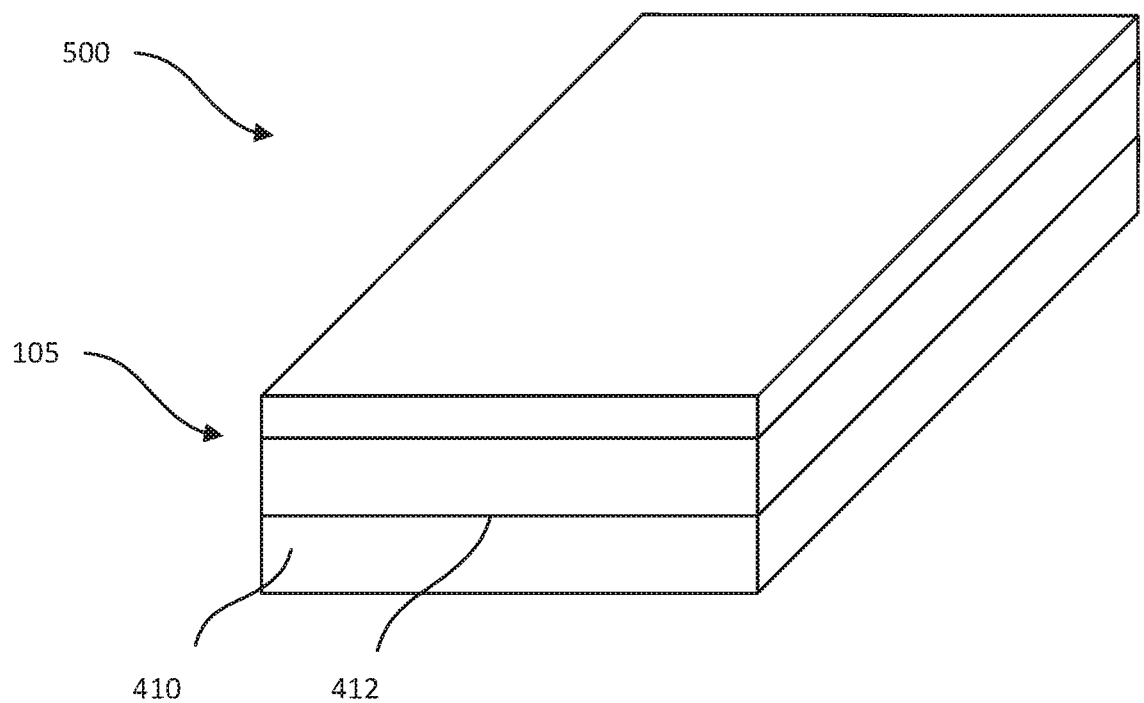
FIG. 5 illustrates a perspective view of an exemplary hybrid roof system in accordance with an exemplary embodiment.

Referring now to FIG. 5, an isometric view of a hybrid roof system 500, in accordance with an exemplary embodiment, is depicted. The hybrid roof system may comprise a building component 410 and a material 105. Material 105 may be sprayed, painted, adhesively bonded, or otherwise adhered to the building surface.

Exemplary roofing systems as disclosed herein provide benefits to the associated building as well as to the local climate, during dry periods as well as during wet periods. As opposed to prior approaches, exemplary roofing systems and materials offer integration of high albedo and moisture retention in a single product, thus facilitating lower heating and cooling costs as well as mitigation of urban heat island effects.

Exemplary materials may be used as an outer construction layer in different building surfaces such as roofs and walls as a strategy to: reduce heating, cooling, and ventilation energy consumption in air-conditioned buildings; increase thermal comfort in un-conditioned buildings; mitigate overheating in un-conditioned buildings or conditioned buildings that temporary lose access to air-conditioning; mitigate the urban heat island effect; and/or manage storm water runoff.

In various exemplary embodiments, the material 105 is porous such that it can store incoming water. The material 105 may also be highly reflective to incoming short-wave radiation (i.e., energy from the sun). In addition, the material 105 may be resistant to adverse effects of weathering, including degradation under UV-radiation. Depending upon the application and climate characteristics, including but not limited to annual ambient temperature, relative humidity, wind, rain, and solar radiation profiles, the properties of the material 105 may be selected and/or optimized.

For example, in a particular embodiment the material properties utilized for a particular roofing installation are selected from among the following: thickness, porosity, albedo (can be fixed or variable such as thermochromic materials), conductivity, thermal emissivity, heat capacity, density, and/or suitability for a particular water feeding scheme. It will be appreciated that the moisture in the material does not necessarily have to come from rainfall. It could be fed artificially using other water sources such as municipal water, stored rainwater, greywater, or the like.

There are multiple ways in which the material may be applied/installed to a building surface, as articulated above. For example, the material may be laid on a surface and affixed in key locations using clamps, screws, nails, or other hardware. Alternatively, it may be ballasted either under its own weight or through the addition of other materials. Yet further, it can be installed within a relatively minimal framing system that allows for functionality of the material, provides additional structural stability, and facilitates the ability to manage foot-traffic without damage to the material. This framing system may be a metallic or plastic structure. Alternatively, it may be a masonry product similar to what is known as porous paving. Alternatively, it may be sprayed, painted, or otherwise applied to a surface as a coating or emulsion which adheres to an existing exterior surface, achieving the desired properties upon drying/curing.

Figure 6:
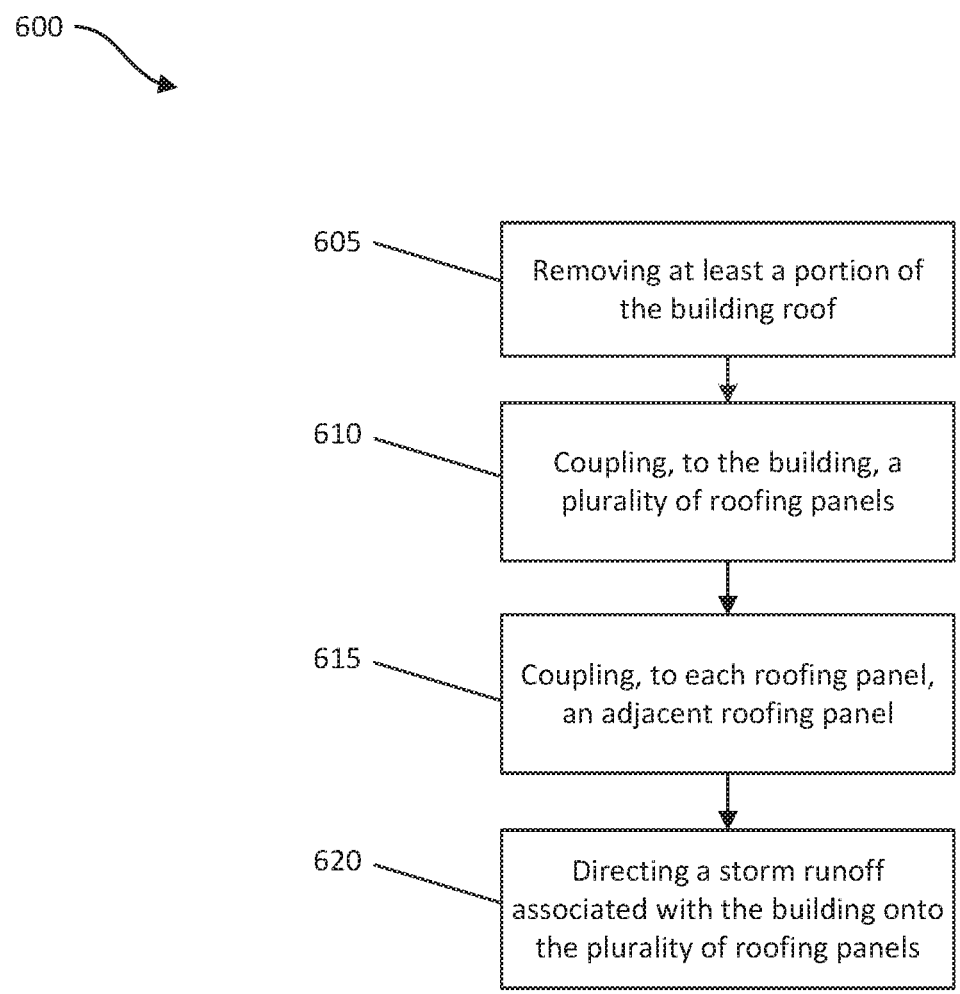
FIG. 6 illustrates a method for retrofitting a roof, in accordance with an exemplary embodiment.
Figure 7A:
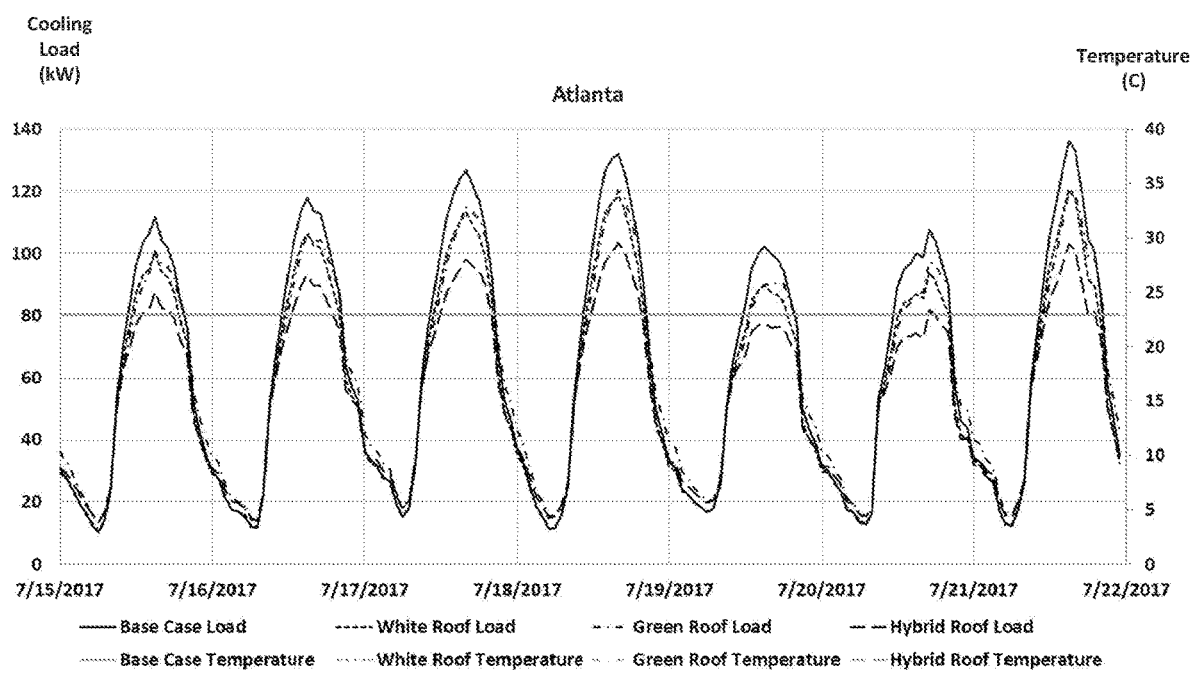
FIGS. 7A and 7B illustrate performance of an exemplary hybrid roof system under cooling load conditions in accordance with an exemplary embodiment.
Figure 7B:
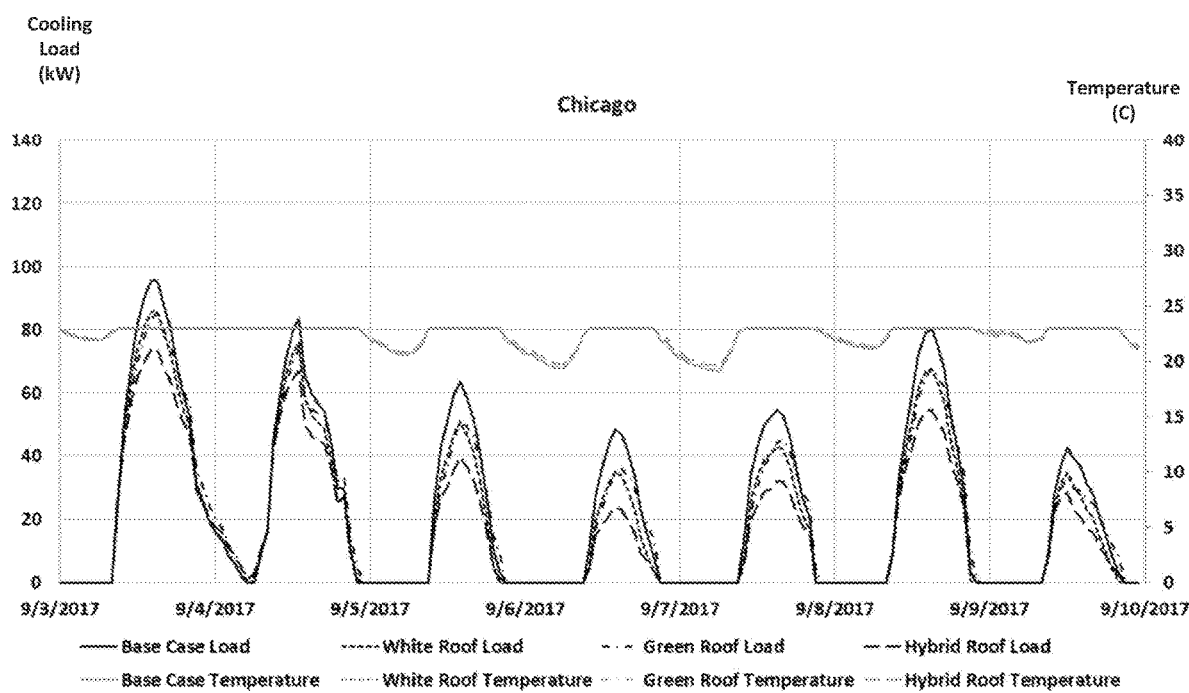
Figure 8A:
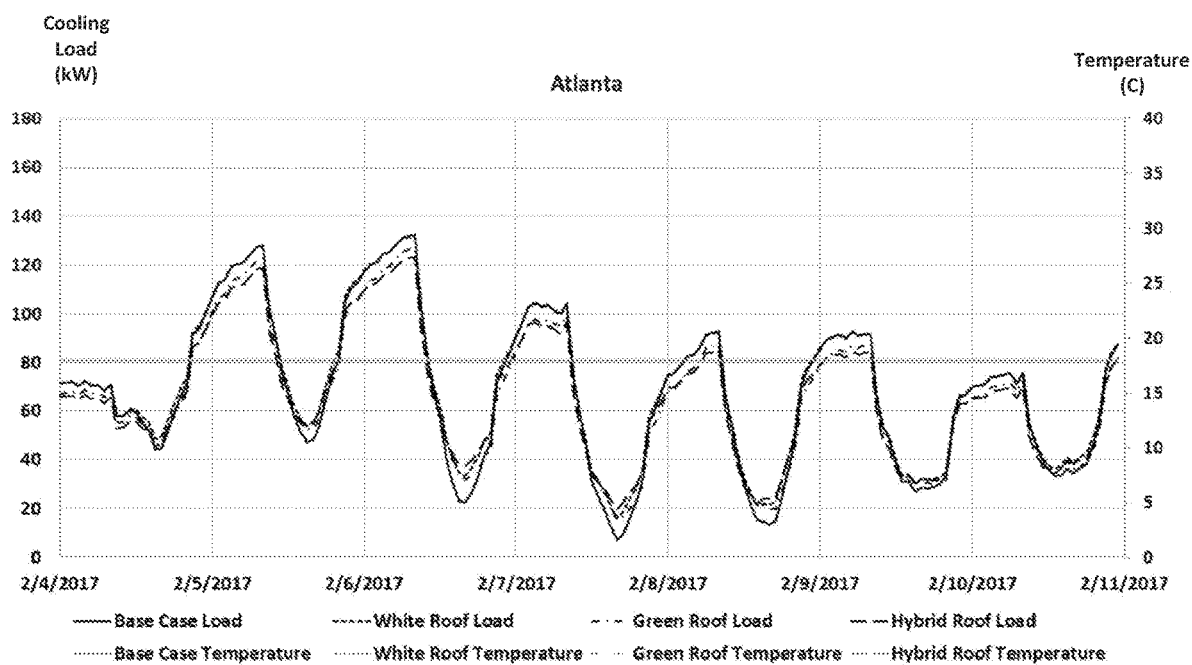
FIGS. 8A and 8B illustrate performance of an exemplary hybrid roof system under heating load conditions in accordance with an exemplary embodiment.
Figure 8B:
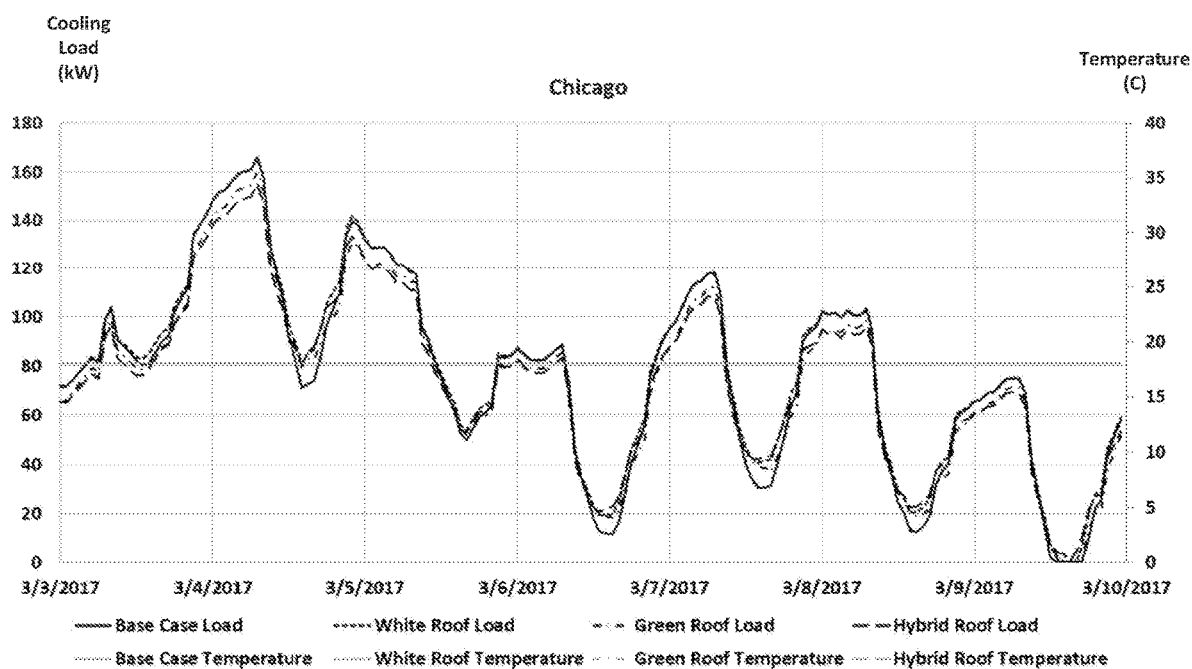
Figure 9:
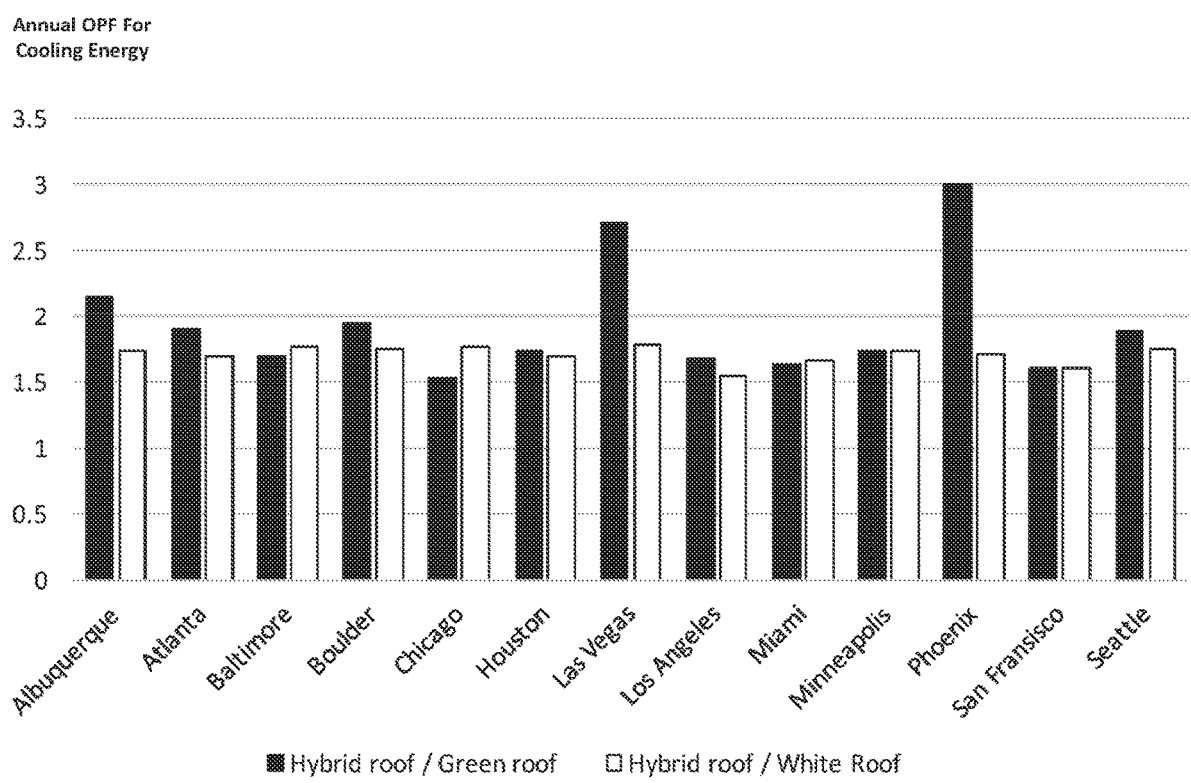
FIG. 9 illustrates superior performance of an exemplary hybrid roof system in various locations and climate conditions compared to a vegetated roof and a white roof in accordance with various exemplary embodiments.

Referring now to FIG. 6, a method for retrofitting a building roof 600, in accordance with an exemplary embodiment, is depicted. The method may optionally comprise removing at least a portion of the building roof (step 605). The building roof may be asphalt shingles, clay and concrete tiles, metal, slate, wood, synthetic, or any roof material known in the art. The removal may be done mechanically via a tear off shovel, a garden fork, or any tool known in the art. Alternatively, the existing roof may be kept unmodified. The method may further comprise coupling to the building, a plurality of roofing panels (step 610). The roofing panels may be coupled to the building by any method known in the art, such as mechanically fastening the panels with nails, screws, clamps, or the like. The method may further comprise coupling each roofing panel of a plurality of roofing panels to an adjacent roofing panel from the plurality of roofing panels (step 615). Step 615 is an optional step. In exemplary embodiments, the plurality of roofing panels may be coupled to the building exclusively.

In an exemplary embodiment, the method may further comprise directing a storm runoff associated with the building onto the plurality of roofing panels (step 620). This water feeding scheme may ensure that storm water runoff is managed properly.

FIGS. 7A, 7B, 8A, 8B, and 9 illustrate performance of exemplary hybrid roof systems and approaches as disclosed herein.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method of retrofitting a building roof, the method comprising:
   coupling, to a building at a location of a removed portion of the building roof, a plurality of roofing panels, wherein each of the roofing panels comprises:
   a rigid frame; and
   a porous water-retaining substrate disposed within the rigid frame, wherein a high albedo coating is disposed on a first side of the porous water-retaining substrate.

2. The method of claim 1, further comprising directing storm runoff associated with the building onto the plurality of roofing panels.

3. The method of claim 1, further comprising coupling each of the roofing panels to an adjacent roofing panel.

4. The method of claim 1, wherein the coupling comprises interlocking a male element from a first roofing panel from the plurality of roofing panels with a female element from an adjacent roofing panel from the plurality of roofing panels.

5. The method of claim 1, further comprising removing at least a portion of the building roof.

6. The method of claim 1, wherein the rigid frame comprises aluminum.

7. The method of claim 1, wherein the high albedo coating comprises a $TiO_2$ anatase coating.

8. The method of claim 1, wherein the substrate comprises polyurethane.

* * * * *